United States Patent
Tan et al.

(10) Patent No.: US 12,257,723 B1
(45) Date of Patent: Mar. 25, 2025

(54) DATA-DRIVEN BIPARTITE CONSENSUS CONTROL METHOD FOR MULTI-ROBOT COLLABORATIVE ROTATION OF LARGE WORKPIECE

(71) Applicant: HUNAN UNIVERSITY, Changsha (CN)

(72) Inventors: Haoran Tan, Changsha (CN); Xueming Zhang, Changsha (CN); You Wu, Changsha (CN); Yiqin Liang, Changsha (CN); Zhenguo Zhang, Changsha (CN); Chenzhuolei Chao, Changsha (CN); Yaonan Wang, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/827,912

(22) Filed: Sep. 9, 2024

Related U.S. Application Data

(63) Continuation of application No. PCT/CN2023/142200, filed on Dec. 27, 2023.

(30) Foreign Application Priority Data

Sep. 8, 2023 (CN) .......................... 202311154709.2

(51) Int. Cl.
  *B25J 9/16* (2006.01)
  *G05D 1/698* (2024.01)
(52) U.S. Cl.
  CPC ............. *B25J 9/1682* (2013.01); *B25J 9/162* (2013.01); *B25J 9/1664* (2013.01); *G05D 1/6985* (2024.01)
(58) Field of Classification Search
  CPC ........ B25J 9/0084; B25J 9/0087; B25J 9/009; B25J 9/161; B25J 9/1617; B25J 9/162;
  (Continued)

(56) References Cited

U.S. PATENT DOCUMENTS

2018/0046153 A1  2/2018  Yu et al.
2022/0152817 A1  5/2022  Song et al.

FOREIGN PATENT DOCUMENTS

CN  106125730 A  11/2016
CN  109445447 A  3/2019
(Continued)

OTHER PUBLICATIONS

Ma, et al., "Necessary and Sufficient Conditions for Leader-Following Bipartite Consensus With Measurement Noise", May 2020, IEEE Transactions on Systems, Man, and Cybernetics: Systems, vol. 50, No. 5, pp. 1976-1981 (Year: 2020).*
(Continued)

*Primary Examiner* — Spencer D Patton
(74) *Attorney, Agent, or Firm* — Bayramoglu Law Offices LLC

(57) ABSTRACT

The provided is a data-driven bipartite consensus control method for multi-robot collaborative rotation of a large workpiece. The method includes: setting a multi-robot system; constructing and discretizing a dynamics model of a follower robot, and constructing a lateral error based on position information between the follower and leader robots; constructing an unknown nonlinear function with the lateral error and a control input as variables, and constructing a lateral error data model of the follower robot through a dynamic linearization technique; designing, based on a topological relationship of the multi-robot system and the lateral error, a bipartite consensus error; substituting the data model into a designed objective function to solve a data-driven bipartite consensus controller; designing a parameter estimation algorithm to estimate an unknown parameter in the controller; allowing an estimated value to participate in a controller update; and calculating a front wheel steering angle control signal.

10 Claims, 12 Drawing Sheets

(58) Field of Classification Search
CPC ...... B25J 9/1664; B25J 9/1669; B25J 9/1682; G05D 1/0027; G05D 1/0293; G05D 1/0295; G05D 1/686; G05D 1/69; G05D 1/692; G05D 1/695; G05D 1/696; G05D 1/698–6987

See application file for complete search history.

(56) References Cited

FOREIGN PATENT DOCUMENTS

| | | |
|---|---|---|
| CN | 113189868 A | 7/2021 |
| CN | 113433828 A | 9/2021 |
| CN | 115179295 A | 10/2022 |
| CN | 115657468 A | 1/2023 |
| CN | 116872221 A | 10/2023 |

OTHER PUBLICATIONS

Ahmed, et al., "Control Analysis and Feedback Techniques for Multi Agent Robots", Jan. 2009, InTech, Multiagent Systems, pp. 103-128 (Year: 2009).*

Zhang, et al., "Leader-Following Regional Multiple-Bipartite Consensus for Networked Lagrangian Systems with Coopetition Interactions", May 2021, MDPI, Symmetry (Year: 2021).*

Zhang Zhen-Hua, et al., Leader-Following Consensus of Second-Order Multi-Agent Systems with Switching Topology, Journal of Guangdong University of Technology, 2018, pp. 75-80, vol. 35 No. 2.

* cited by examiner

DATA-DRIVEN BIPARTITE CONSENSUS CONTROL METHOD FOR MULTI-ROBOT COLLABORATIVE ROTATION OF LARGE WORKPIECE

CROSS REFERENCE TO THE RELATED APPLICATIONS

This application is a continuation application of International Application No. PCT/CN2023/142200, filed on Dec. 27, 2023, which is based upon and claims priority to Chinese Patent Application No. 202311154709.2, filed on Sep. 8, 2023, the entire contents of which are incorporated herein by reference.

TECHNICAL FIELD

The present disclosure relates to the technical field of multi-robot collaborative handling control, and in particular to a data-driven bipartite consensus control method for multi-robot collaborative rotation of a large workpiece.

BACKGROUND

In recent years, intelligent manufacturing equipment represented by cluster robots is gradually becoming the basis for achieving high-quality manufacturing of large and complex components. Featuring flexible movement and strong coordination ability, cluster robots can replace manual labor to complete specific tasks efficiently in complex working environments. Therefore, designing a multi-robot autonomous coordinated control method in the field of intelligent manufacturing is of great significance.

Mobile robots have gone through a development process from remote control to autonomous control, from wired to wireless, and have now developed into a mature mobile platform. Mobile platforms equipped with corresponding supporting components can be used in different intelligent manufacturing scenarios. For example, a mobile platform equipped with radar can achieve two-dimensional (2D) mapping, and a mobile platform equipped with binocular cameras can achieve three-dimensional (3D) scanning of large workpieces. In addition, a mobile platform equipped with a robotic arm can become a mobile robot capable of performing handling, rotation, and assembly tasks. Through in-depth research, researchers have applied mobile robots with robotic arms to perform grasping and assembly tasks, replace force sensors to measure contact forces, and complete bionic work through parallel robotic arms.

In the field of intelligent manufacturing, as an essential part of the intelligent manufacturing industry, multi-robot collaborative handling is driving the development of mobile robots from single-robot to multi-robot. Some scholars have conducted research on this to some extent, but there are still some difficulties that need to be overcome. Among them, when multiple robots are used to handle a large workpiece, they are limited by the volume of the workpiece and the external space. Therefore, rotating the large workpiece with a minimum rotation radius during the handling process is an issue worth studying.

SUMMARY

A technical problem to be solved by the present disclosure is that when multiple robots are used to handle a large workpiece, they are limited by the volume of the workpiece and the external space. In order to complete the task of rotating the workpiece with a minimum rotation radius, the present disclosure provides a data-driven bipartite consensus control method for multi-robot collaborative rotation of a large workpiece.

The present disclosure resolves the technical problem with following technical solution:

The data-driven bipartite consensus control method for multi-robot collaborative rotation of a large workpiece includes the following steps:

S100: setting a multi-robot system for achieving a rotation task, including a static leader robot for providing only expected signals and two follower robots;

S200: constructing a rotation dynamics model of the follower robots, discretizing the rotation dynamics model to acquire a corresponding discrete-time system, and constructing a lateral error between the follower and leader robots based on position information between the follower and leader robots;

S300: constructing, based on the discrete-time system, an unknown nonlinear function with the lateral error and a control input as variables; and constructing, based on the unknown nonlinear function, a lateral error data model of the follower robots through a dynamic linearization technique;

S400: constructing, based on a topological relationship of the multi-robot system and the lateral error between the follower and leader robots, a bipartite consensus error for the rotation task; substituting the bipartite consensus error and the lateral error data model into a designed control input objective function to solve a data-driven bipartite consensus controller; designing a parameter estimation algorithm to estimate an unknown parameter in the controller; and allowing an estimated value to participate in a controller update under the condition of satisfying a designed reset algorithm, where the parameter estimation algorithm, the reset algorithm, and the controller together form a data-driven bipartite consensus control algorithm for the multi-robot collaborative rotation of the large workpiece; and S500: calculating, based on the data-driven bipartite consensus control algorithm, a front wheel steering angle control signal; and inputting the front wheel steering angle control signal into the multi-robot system to complete a rotation control of the large workpiece.

Preferably, in the step S100, the multi-robot system includes a quadrotor serving as the leader robot and two mobile robots with robotic arms as the follower robots, where there is an antagonistic interaction between the follower robots; and the antagonistic interaction means that movement directions are opposite to front wheel steering directions.

Preferably, the step S200 includes:

S210: constructing a rotation dynamics model of a single follower robot, specifically:

$$\begin{cases} \dot{x}_n = v_0 \cos(\theta_n) \\ \dot{y}_n = v_0 \sin(\theta_n) \\ \dot{\theta}_n = v_0 \tan(u_n)/L \end{cases}$$

where, $n \in \{1, 2\}$ denotes an n-th follower robot; $x_n$ denotes a lateral displacement of the n-th follower robot; $y_n$ denotes a longitudinal displacement of the n-th follower robot; $\theta_n$ denotes a heading angle of the n-th follower robot; $v_0$ denotes a constant speed of the follower robot during a rotation process; $u_n$ denotes a control input, representing a front wheel steering angle of the n-th follower robot; L denotes a wheelbase of the follower robot; and $\dot{x}_n$, $\dot{y}_n$, and $\dot{\theta}_n$, respectively denote first-order derivatives of the lateral displacement $x_n$, the longitudinal displacement $y_n$, and the heading angle $\theta_n$ of the n-th follower robot;

S220: discretizing the rotation dynamics model of the single follower robot to acquire a discrete-time system of the single follower robot, specifically:

$$\begin{cases} x_n(k+1) = x_n(k) + v_0 T_s \cos(\theta_n(k)) \\ y_n(k+1) = y_n(k) + v_0 T_s \sin(\theta_n(k)) \\ \theta_n(k+1) = \theta_n(k) + v_0 \tan(u_n(k))/L \end{cases}$$

where, $T_s$ denotes a sampling time; $k \in \{1, 2, \ldots, \infty\}$ denotes a discrete time; $x_n(k+1)$, $y_n(k+1)$, and $\theta_n(k+1)$ denote a lateral displacement, a longitudinal displacement, and a heading angle of the n-th follower robot at a (k+1)-th time, respectively; $x_n(k)$, $y_n(k)$, and $\theta_n(k)$ denote a lateral displacement, a longitudinal displacement, and a heading angle of the n-th follower robot at a k-th time, respectively; L and $v_0$ denote the wheelbase and the constant speed, respectively; and $u_n(k)$ denotes a control input, specifically, a front wheel steering angle, of the n-th follower robot at the k-th time; and S230: constructing the lateral error between the follower and leader robots based on the position information between the follower and leader robots.

Preferably, in the step S230, the lateral error between the n-th follower and the leader robot at the k-th time is specifically:

$$e_n(k) = l_d \cos(\alpha_n(k))$$

where, $$\alpha_n(k) = \arctan\left(\frac{y_n^*(k) - y_n(k)}{x_n^*(k) - x_n(k)}\right) - \theta_n(k); y_n^*(k) \text{ and } x_n^*(k)$$

denote expected signals provided by the leader robot for the n-th follower; and $l_d$ denotes a forward distance.

Preferably, the step S300 includes:

S310: constructing, based on the discrete-time system, the unknown nonlinear function with the lateral error and the control input as variables, specifically:

$$e_n(k+1) = f_n(u_n(k), \ldots, u_n(k-n_u+1), e_n(k), \ldots, e_n(k-n_e+1), x_n(k), y_n(k), \theta_n(k))$$

where, $e_n(k+1)$ denotes the lateral error of the n-th follower robot at the (k+1)-th time; $f_n(\cdot \cdot \cdot)$ denotes an unknown scalar nonlinear function that is partially-derivable, with continuous partial derivatives, for first $n_u + n_e$ variables; $n_u$ and $n_e$ are two unknown positive integers, representing system input and output orders; and $u_n(k-n_u+1)$ and $e_n(k-n_e+1)$ denote a control input of the n-th follower robot at a $(k-n_u+1)$-th time and a lateral error thereof at a $(k-n_u+1)$-th time, respectively; and S320: constructing, based on the unknown nonlinear function, the lateral error data model of the follower robots through the dynamic linearization technique, specifically:

$$e_n(k+1) = e_n(k) + \phi_n^T(k) \Delta H_n(k)$$

where, $\phi_n(k) = [\phi_{n,1}(k), \ldots, \phi_{n,n_u}(k), \phi_{n,n_u+1}(k), \ldots, j\phi_{n,n_u+n_e}(k)]^T$ denotes a pseudo gradient of the n-th robot; $\Delta H_n(k) = [\Delta u_n(k), \ldots, \Delta u_n(k-L_u+1), \Delta e_n(k), \ldots, \Delta e_n(k-L_e+1)]^T$ denotes a vector composed of all control input increments and system output increments of the n-th robot; $1 \leq L_u \leq n_u$ and $0 \leq L_e \leq n_e$ are two positive integers selected based on system complexity; $L_e$ and $L_u$ denotes input and output pseudo orders of the multi-robot system, respectively; $\Delta u_n(k) = u_n(k) - u_n(k-1)$; and $\Delta e_n(k) = e_n(k) - e_n(k-1)$.

Preferably, the step S400 includes:

S410: constructing, based on the topological relationship of the multi-robot system and the lateral error between the follower and leader robots, the bipartite consensus error for the rotation task;

S420: substituting the bipartite consensus error and the lateral error data model into the designed control input objective function to solve the data-driven bipartite consensus controller;

S430: designing the parameter estimation algorithm to estimate the unknown parameter in the controller; and S440: allowing the estimated value to participate in the controller update under the condition of satisfying the designed reset algorithm, where the parameter estimation algorithm, the reset algorithm, and the controller together form the data-driven bipartite consensus control algorithm for the multi-robot collaborative rotation of the large workpiece.

Preferably, in the step S410, the bipartite consensus error is specifically:

$$E_n(k) = \sum_{i=1}^{2} a_{n,i}(e_i(k) - \text{sign}(a_{n,i})e_n(k)) + a_{n,3}(e*(k) - \text{sign}(a_{n,3})e_n(k))$$

where, $E_n(k)$ denotes the bipartite consensus error of the n-th follower robot at the k-th time; $a_{i,j}$ denotes an element in an i-th row and a j-th column of a robot adjacency matrix $A \in R^{3 \times 3}$; $a_{3,j}$ and $a_{i,3}$ denote a topological communication relationship between the leader robot and the follower robot, $i, j \in \{1,2,3\}$; $e^*(k)$ denotes an expected signal for the lateral error; and sign denotes a sign function:

$$\text{sign}(a) = \begin{cases} 1, & a > 0 \\ 0, & a = 0 \\ -1, & a < 0 \end{cases}$$

Preferably, in the step S420, the control input objective function is specifically:

$$J(u_n(k)) = \left|\sum_{i=1}^{2} a_{n,i}(e_i(k) - \text{sign}(a_{n,i})e_n(k+1)) + a_{n,3}(e^*(k) - \text{sign}(a_{n,3})e_n(k+1))\right|^2 + \hat{\lambda}_n |u_n(k) - u_n(k-1)|^2$$

where, $J(\cdot)$ denotes the objective function of the n-th follower robot with respect to the corresponding control input $u_n(k)$; and $\hat{\lambda}_n$ denotes a penalty factor for the objective function of the n-th follower robot;

calculating a partial derivative of $u_n(k)$ in the control input objective function to acquire the data-driven bipartite consensus controller as follows:

$$u_n(k) = u_n(k-1) + \frac{\rho_1 d_n \phi_{n,1}(k) E_n(k)}{\hat{\lambda}_n + d_n^2 |\phi_{n,1}(k)|^2} - \frac{d_n \phi_{n,1}(k) \sum_{i=2}^{L_u} \rho_i \phi_{n,i}(k) \Delta u_n(k-i+1)}{\hat{\lambda}_n + d_n^2 |\phi_{n,1}(k)|^2} -$$

$$\frac{d_n \phi_{n,1}(k) \sum_{j=L_u+1}^{L_u+L_e} \rho_j \phi_{n,i}(k) \Delta e_n(k-i+l_u+1)}{\hat{\lambda}_n + d_n^2 |\phi_{n,1}(k)|^2}$$

where, $\rho_i$ denotes a step factor, $i \in \{1, 2, \ldots, L_u+L_e\}$; and $$d_n = \sum_{i=1}^{3} |a_{n,i}| = \sum_{i=1}^{3} a_{n,i} \text{sign}(a_{n,i})$$

denotes an element on a main diagonal of an in-degree matrix, $D = \text{diag}(d_1, d_2, d_3)$.

Preferably, in the step S430, the parameter estimation algorithm is specifically:

$$\phi_n(k) = \phi_n(k-1) +$$

$$\frac{\eta \Delta H_n(k-1)(e_n(k) - e_n(k-1))}{\mu + \|\Delta H_n(k-1)\|^2} - \frac{\eta \Delta H_n(k-1) \phi_n^T(k-1) \Delta H_n(k-1)}{\mu + \|\Delta H_n(k-1)\|^2}$$

where, $n \in (0,2]$ and $\mu \in [0,\infty)$ denote a corresponding step factor and penalty factor, respectively; and $\hat{\phi}_n(k)$ denotes an estimated value of $\phi_n(k)$;

in the step S440, the reset algorithm is specifically:

$\phi_n(k) = \phi_n(1)$, if $\|\phi_n(k)\| \le \varepsilon$ or $\|\Delta H_n(k-1)\| \le \varepsilon$ or $\text{sign}(\hat{\phi}_{n,j}(k)) \ne \text{sign}(\hat{\phi}_{n,j}(1)), j=1,\ldots,L_u+L_e$ where, $\varepsilon$ denotes a minimum positive number.

Preferably, in the step S500, the data-driven bipartite consensus control algorithm is specifically:

$$\begin{cases} \phi_n(k) = \phi_n(k-1) + \frac{\eta \Delta H_n(k-1)(e_n(k)-e_n(k-1))}{\mu + \|\Delta H_n(k-1)\|^2} - \\ \qquad\qquad\qquad\qquad \frac{\eta \Delta H_n(k-1)\phi_n^T(k-1)\Delta H_n(k-1)}{\mu + \|\Delta H_n(k-1)\|^2} \\ \phi_n(k) = \phi_n(1), \text{ if } \|\phi_n(k)\| \le \varepsilon \text{ or } \|\Delta H_n(k-1)\| \le \varepsilon \text{ or} \\ \qquad\qquad \text{sign}(\hat{\phi}_{n,j}(k)) \ne \text{sign}(\hat{\phi}_{n,j}(1)), j=1,\ldots,L_u+L_e \\ u_n(k) = u_n(k-1) + \frac{\rho_1 d_n \hat{\phi}_{n,1}(k) E_n(k)}{\hat{\lambda}_n + d_n^2 |\hat{\phi}_{n,1}(k)|^2} - \frac{d_n \phi_{n,1}(k) \sum_{i=2}^{L_u} \rho_i \hat{\phi}_{n,i}(k) \Delta u_n(k-i+1)}{\hat{\lambda}_n + d_n^2 |\hat{\phi}_{n,1}(k)|^2} - \\ \qquad\qquad \frac{d_n \phi_{n,1}(k) \sum_{j=L_u+1}^{L_u+L_e} \rho_j \hat{\phi}_{n,i}(k) \Delta e_n(k-i+l_u+1)}{\hat{\lambda}_n + d_n^2 |\hat{\phi}_{n,1}(k)|^2} \end{cases}$$

The present disclosure provides a data-driven bipartite consensus control method for multi-robot collaborative rotation of a large workpiece. In the present disclosure, through the data-driven bipartite consensus controller, under the leadership of the static leader robot, the follower robot synchronously moves in the opposite direction along the reference trajectory, thereby achieving the rotation task. In the data-driven control method, the controller design only relies on the input/output (I/O) data of the controlled system, and does not require an accurate dynamic model. Since it is not necessary to construct a dynamic model, the present disclosure simplifies the controller design process, providing a very user-friendly control design method. This method ensures rotation accuracy and safety for the multi-robot collaborative handling of the large workpiece.

DETAILED DESCRIPTION OF THE EMBODIMENTS

To enable those skilled in the art to better understand the technical solutions of the present disclosure, the present disclosure will be further described in detail below with reference to the accompanying drawings.

Figure 1:
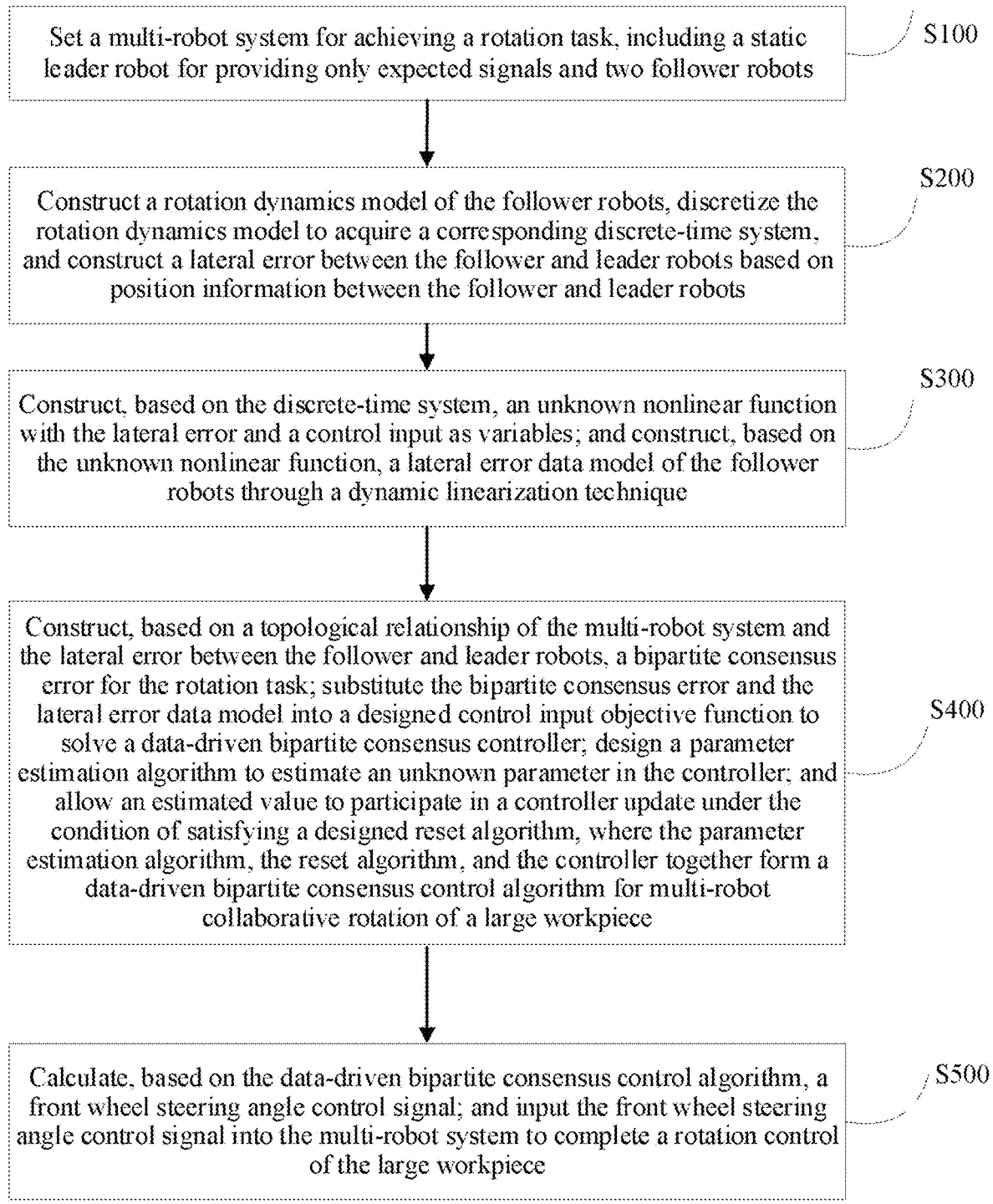
FIG. 1 is a flowchart of a data-driven bipartite consensus control method for multi-robot collaborative rotation of a large workpiece according to an embodiment of the present disclosure.

In an embodiment, as shown in FIG. 1, a data-driven bipartite consensus control method for multi-robot collaborative rotation of a large workpiece includes the following steps.

S100. A multi-robot system is set for achieving a rotation task, including a static leader robot for providing only expected signals and two follower robots.

In an embodiment, in the step S100, the multi-robot system includes a quadrotor serving as the leader robot and two mobile robots with robotic arms as the follower robots, where there is an antagonistic interaction between the follower robots; and the antagonistic interaction means that movement directions are opposite to front wheel steering directions.

S200. A rotation dynamics model of the follower robots is constructed, and discretized to acquire a corresponding discrete-time system, and a lateral error between the follower and leader robots is constructed based on position information between the follower and leader robots.

Figure 2:
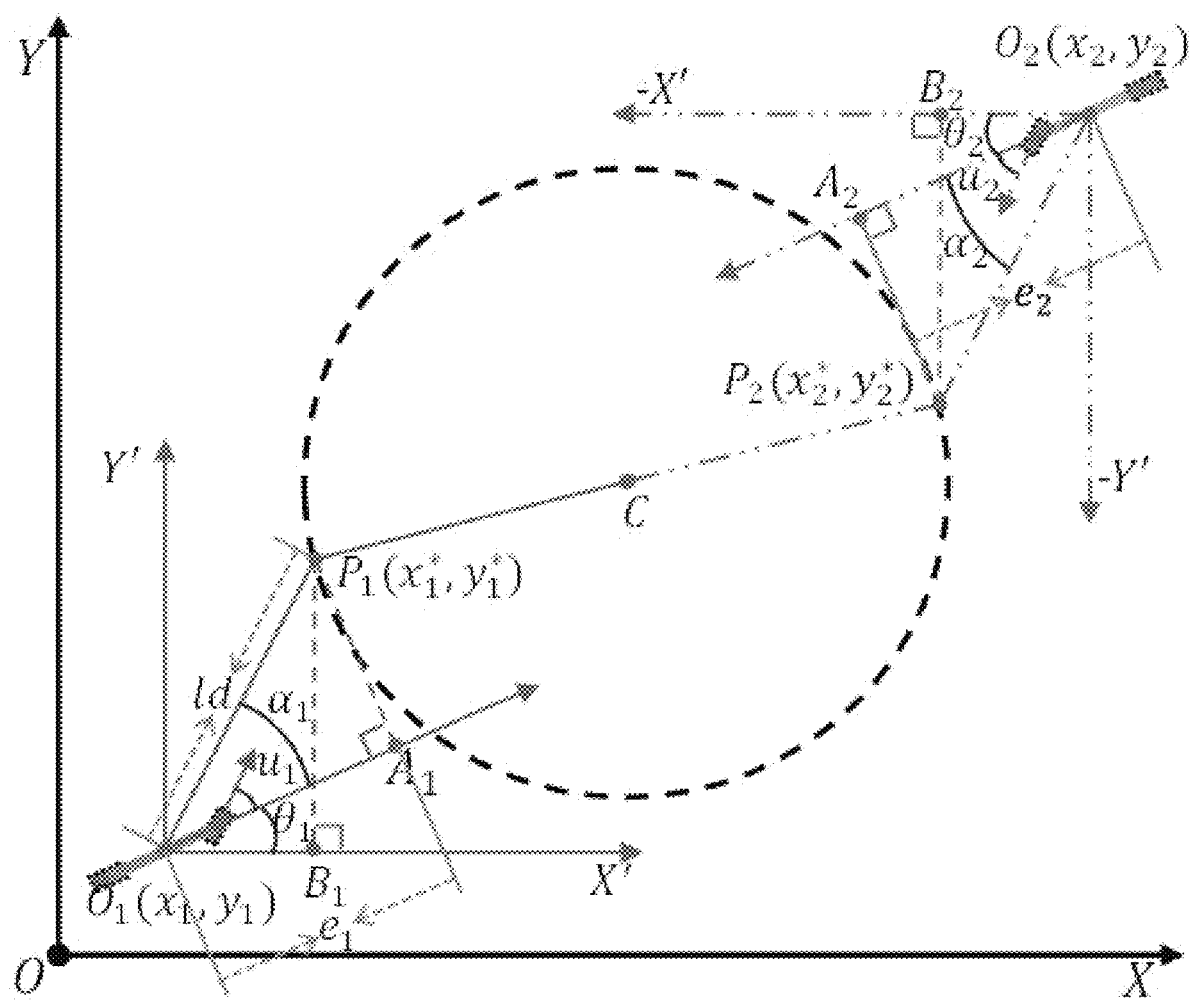
FIG. 2 is a schematic diagram showing positions and lateral errors of multiple robots during a rotation process of collaboratively handling the large workpiece according to an embodiment of the present disclosure.

Specifically, FIG. 2 shows multi-robot positions and lateral errors. Before constructing the rotation dynamics model of the follower robots, the specified performance and performance function of the robot are set, and the position and error of the robot are determined based on the specified performance and performance function.

In an embodiment, the step S200 includes the following sub-steps.

S210. A rotation dynamics model of a single follower robot is constructed, specifically:

$$\begin{cases} \dot{x}_n = v_0\cos(\theta_n) \\ \dot{y}_n = v_0\sin(\theta_n) \\ \dot{\theta}_n = v_0\tan(u_n)/L \end{cases} \quad (1)$$

where, $n \in \{1,2\}$ denotes an n-th follower robot; $x_n$ denotes a lateral displacement of the n-th follower robot; $y_n$ denotes a longitudinal displacement of the n-th follower robot; $\theta_n$ denotes a heading angle of the n-th follower robot; $v_0$ denotes a constant speed of the follower robot during a rotation process; $u_n$ denotes a control input, representing a front wheel steering angle of the n-th follower robot; L denotes a wheelbase of the follower robot; and $\dot{x}_n$, $\dot{y}_n$, and $\dot{\theta}_n$ respectively denote first-order derivatives of the lateral displacement $x_n$, the longitudinal displacement $y_n$, and the heading angle $\theta_n$ of the n-th follower robot.

S220. The rotation dynamics model of the single follower robot is discretized to acquire a discrete-time system of the single follower robot, specifically:

$$\begin{cases} x_n(k+1) = x_n(k) + v_0 T_s \cos(\theta_n(k)) \\ y_n(k+1) = y_n(k) + v_0 T_s \sin(\theta_n(k)) \\ \theta_n(k+1) = \theta_n(k) + v_0 \tan(u_n(k))/L \end{cases} \quad (2)$$

where, $T_s$ denotes a sampling time; $k \in \{1, 2, \ldots, \infty\}$ denotes a discrete time; $x_n(k+1)$, $y_n(k+1)$, and $\theta_n(k+1)$ denote a lateral displacement, a longitudinal displacement, and a heading angle of the n-th follower robot at a (k+1)-th time, respectively; $x_n(k)$, $y_n(k)$, and $\theta_n(k)$ denote a lateral displacement, a longitudinal displacement, and a heading angle of the n-th follower robot at a k-th time, respectively; L and $v_0$ denote the wheelbase and the constant speed, respectively; and $u_n(k)$ denotes a control input, specifically, a front wheel steering angle, of the n-th follower robot at the k-th time.

S230. The lateral error between the follower and leader robots is constructed based on the position information between the follower and leader robots.

In an embodiment, in the step S230, the lateral error between the n-th follower and the leader robot at the k-th time is specifically:

$$e_n(k) = l_d \cdot \cos(\alpha_n(k)) \quad (3)$$

where, $$\alpha_n(k) = \arctan\left(\frac{y_n^*(k) - y_n(k)}{x_n^*(k) - x_n(k)}\right) - \theta_n(k); y_n^*(k) \text{ and } x_n^*(k)$$

denote expected signals provided by the leader robot for the n-th follower; and $l_d$ denotes a forward distance.

Furthermore, the forward distance is an adjustable parameter. A larger parameter value indicates a smoother tracking curve, and a smaller parameter value indicates a more frequent fluctuation in the tracking curve.

S300. Based on the discrete-time system, an unknown nonlinear function is constructed with the lateral error and a control input as variables, and based on the unknown nonlinear function, a lateral error data model of the follower robots is constructed through a dynamic linearization technique.

In an embodiment, the step S300 includes the following sub-steps.

S310. Based on the discrete-time system, the unknown nonlinear function is constructed with the lateral error and the control input as variables, specifically:

$$e_n(k+1) = f_n(u_n(k), \ldots, u_n(k-n_u+1), e_n(k), \ldots, e_n(k-n_e+1), x_n(k), y_n(k), \theta_n(k)) \quad (4)$$

where, $e_n(k+1)$ denotes the lateral error of the n-th follower robot at the (k+1)-th time; $f_n(\bullet \bullet \bullet)$ denotes an unknown scalar nonlinear function that is partially-derivable, with continuous partial derivatives, for first $n_u + n_e$ variables; $n_u$ and $n_e$ are two unknown positive integers, representing system input and output orders; and $u_n(k-n_u+1)$ and $e_n(k-n_e+1)$ denote a control input of the n-th follower robot at a $(k-n_u+1)$-th time and a lateral error thereof at a $(k-n_e+1)$-th time, respectively.

Specifically, the values of $n_u$ and $n_e$ depend on the complexity of the nonlinear system, that is, a more complex system leads to larger values of $n_u$ and $n_e$.

S320. Based on the unknown nonlinear function, the lateral error data model of the follower robots is constructed through the dynamic linearization technique, specifically:

$$e_n(k+1)=e_n(k)+\phi_n^T(k)\Delta H_n(k) \tag{5}$$

where, $\phi_n(k)=[\phi_{n,1}(k), \ldots, \phi_{n,n_u}(k), \phi_{n,n_e+1}(k), \ldots, \phi_{n,n_u+n_e}(k)]^T$ denotes a pseudo gradient of the n-th robot; $\Delta H_n(k)=[\Delta u_n(k), \ldots, \Delta u_n(k-L_u+1), \Delta e_n(k), \ldots, \Delta e_n(k-L_e+1)]^T$ denotes a vector composed of all control input increments and system output increments of the n-th robot; $1 \leq L_u \leq n_u$ and $0 \leq L_e \leq n_e$ are two positive integers selected based on system complexity; $L_e$ and $L_u$ denotes input and output pseudo orders of the multi-robot system, respectively; $\Delta u_n(k)=u_n(k)-u_n(k-1)$; and $\Delta e_n(k)=e_n(k)-e_n(k-1)$.

Specifically, a general nonlinear system equation is constructed based on the lateral error.

1) A discrete dynamic equation of the follower robot is substituted into a lateral error calculation equation to acquire a rewritten error propagation dynamic model:

$$e_n(k+1) - l_d \cdot \cos\left(\arctan\left(\frac{y_n^*(k+1) - y_n(k) - v_0 T_s \sin(\theta_n(k))}{x_n^*(k+1) - x_n(k) - v_0 T_s \cos(\theta_n(k))}\right) - \left(\theta_n(k) + v_0 \tan(u_n(k))/L\right)\right) \tag{6}$$

Subtracting Eq. (3) from Eq. (6) yields:

$$\Delta e_n(k+1) = l_d \cdot \cos\left(\arctan\left(\frac{y_n^*(k+1) - y_n(k) - v_0 T_s \sin(\theta_n(k))}{x_n^*(k+1) - x_n(k) - v_0 T_s \cos(\theta_n(k))}\right) - (\theta_n(k) + v_0 \tan(u_n(k))/L)\right) - l_d \cdot \cos\left(\arctan\left(\frac{y_n^*(k) - y_n(k)}{x_n^*(k) - x_n(k)}\right) - \theta_n(k)\right) \tag{7}$$

where, $\Delta e_n(k+1)=e_n(k+1)-e_n(k)$ denotes a lateral error increment of the n-th follower robot at the k+1-th time.

According to Eq. (7), the lateral error $e_n(k+1)$ is related to variables $e_n(k)$, $x_n(k)$, $y_n(k)$, $\theta_n(k)$, and $u_n(k)$. Therefore, an unknown nonlinear function is constructed with $e_n(k+1)$ as a dependent variable and the remaining variables as an independent variable, specifically:

$$e_n(k+1)=g_n(u_n(k),e_n(k),x_n(k),y_n(k),\theta_n(k)) \tag{8}$$

where, $g_n(\cdot \cdot \cdot)$ denotes the unknown nonlinear function. In order to make the nonlinear function more general, $g_n(\cdot \cdot \cdot)$ is rewritten as follows:

$$e_n(k+1)=f_n(u_n(k), \ldots, u_n(k-n_u+1),e_n(k), \ldots, e_n(k-n_\theta+1),x_n(k),y_n(k),\theta_n(k)) \tag{9}$$

where, $f_n(\cdot \cdot \cdot)$ denotes a rewritten general unknown nonlinear system, which is partially-derivable, with continuous partial derivatives, for the first $n_u+n_e$ variables.

2) Based on the rewritten nonlinear system (9) and Cauchy's mean value theorem, the following equation is acquired:

$$\begin{aligned}e_n(k+1) - e_n(k) &= f_n(u_n(k), \ldots, u_n(k-n_u+1), e_n(k), \ldots, e_n(k-n_\theta+1), \\ &\quad x_n(k), y_n(k), \theta_n(k)) - f_n(u_n(k-1), \ldots, u_n(k-n_u), \\ &\quad e_n(k-1), \ldots, e_n(k-n_\theta), x_n(k-1), y_n(k-1), \theta_n(k-1)) \\ &= \frac{\partial f_n}{\partial u_n(k)}\Delta u_n(k) + f_n(u_n(k-1), \ldots, u_n(k-n_u+1), e_n(k), \ldots, \\ &\quad e_n(k-n_\theta+1), x_n(k), y_n(k), \theta_n(k)) - f_n(u_n(k-1), \ldots, u_n(k-n_u), \\ &\quad e_n(k-1), \ldots, e_n(k-n_\theta), x_n(k-1), y_n(k-1), \theta_n(k-1)) - \\ &\quad \frac{\partial f_n}{\partial u_n(k)}\Delta u_n(k) + \ldots + \frac{\partial f_n}{\partial u_n(k-n_u+1)}\Delta u_n(k-n_u+1) + \\ &\quad \frac{\partial f_n}{\partial e_n(k)}\Delta e_n(k) + \ldots + \frac{\partial f_n}{\partial e_n(k-n_e+1)}\Delta e_n(k-n_e+1) + h_n\end{aligned} \tag{10}$$

where, $h_n=f_n(u_n(k-1), \ldots, u_n(k-n_u),e_n(k-1), \ldots, e_n(k-n_\theta),$
$x_n(k),y_n(k),\theta_n(k))-f_n(u_n(k-1), \ldots, u_n(k-n_u),e_n(k-1), \ldots, e_n(k-n_\theta),x_n(k-1),y_n(k-1),\theta_n(k-1))$ Since the variables in $h_n$ are known or can be calculated according to Eq. (3), there must be a solution for $h_n$ that holds the following equation:

$$h_n=\zeta_n^T \Delta H(k) \tag{11}$$

where, $\Delta H_n(k)=[\Delta u_n(k), \ldots, \Delta u_n(k-L_u+1), \Delta e_n(k), \ldots, \Delta e_n(k-L_e+1)]^T$, and $\zeta_n=[\zeta_{n,1}, \ldots, \zeta_{n,2}]^T$ is a constant vector.

Then, substituting Eq. (11) into Eq. (10) yields:

$$\begin{aligned}e_n(k+1) - e_n(k) &= \\ &\left[\frac{\partial f_n}{\partial u_n(k)}, \ldots, \frac{\partial f_n}{\partial u_n(k-n_u+1)}, \frac{\partial f_n}{\partial e_n(k)}, \ldots, \frac{\partial f_n}{\partial e_n(k-n_e+1)}\right]^T \Delta H(k) + \\ &\zeta_n^T \Delta H(k)\end{aligned} \tag{12}$$

Finally, let the vector $\phi_n(k)$ satisfy the following equation:

$$\begin{aligned}\phi_n(k) &= \left[\phi_{n,1}(k), \ldots, \phi_{n,n_e}(k), \phi_{n,n_e+1}(k), \ldots, \phi_{n,n_e+n_u}(k)\right]^T \\ &= \left[\frac{\partial f_n}{\partial u_n(k)}, \ldots, \frac{\partial f_n}{\partial u_n(k-n_u+1)}, \frac{\partial f_n}{\partial e_n(k)}, \ldots, \frac{\partial f_n}{\partial e_n(k-n_e+1)}\right]^T + \zeta_n^T\end{aligned} \tag{13}$$

So Eq. (12) can be rewritten as $e_n(k+1)-e_n(k)=\phi_n^T(k)\Delta H_n(k)$, that is, Eq. (5) holds.

S400. Based on a topological relationship of the multi-robot system and the lateral error between the follower and leader robots, a bipartite consensus error is constructed for the rotation task. The bipartite consensus error and the lateral error data model are substituted into a designed control input objective function to solve a data-driven bipartite consensus controller. A parameter estimation algorithm is designed to estimate an unknown parameter in the controller. An estimated value participates in a controller update under the condition of satisfying a designed reset algorithm, where the parameter estimation algorithm, the reset algorithm, and the controller together form a data-driven bipartite consensus control algorithm for the multi-robot collaborative rotation of the large workpiece.

Figure 3:
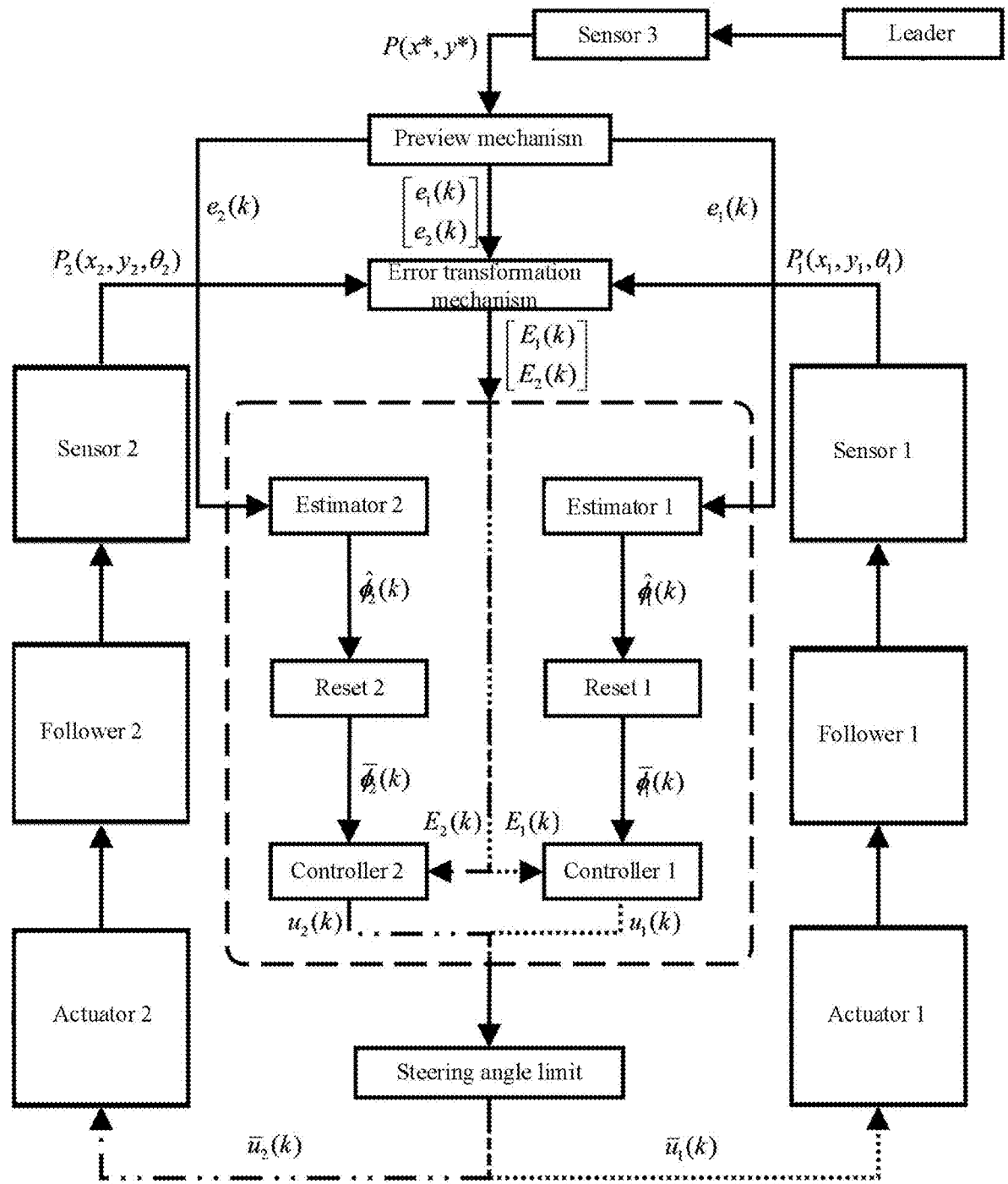
FIG. 3 is a schematic diagram of the data-driven bipartite consensus control method for multi-robot collaborative rotation of a large workpiece according to an embodiment of the present disclosure.
Figure 4:
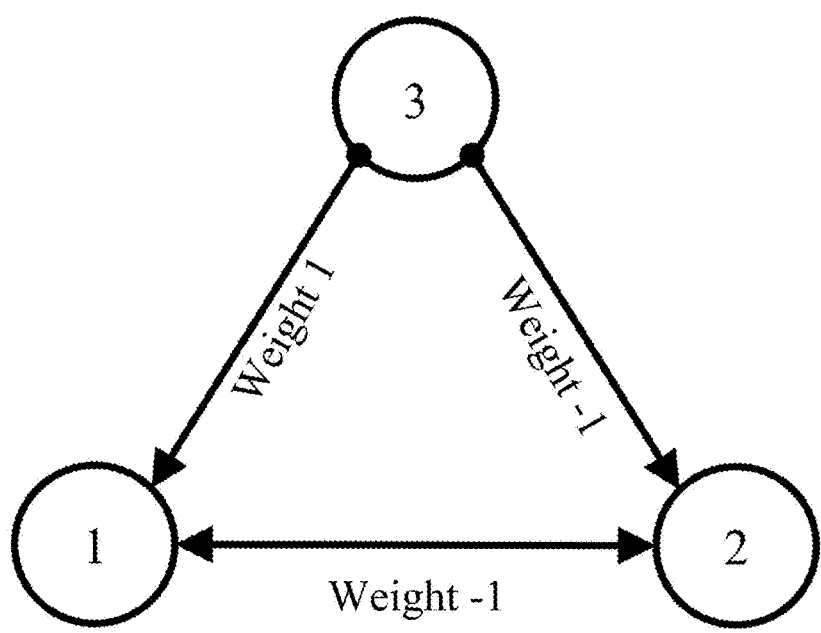
FIG. 4 is a topology diagram of a multi-robot system according to an embodiment of the present disclosure.
Figure 5:
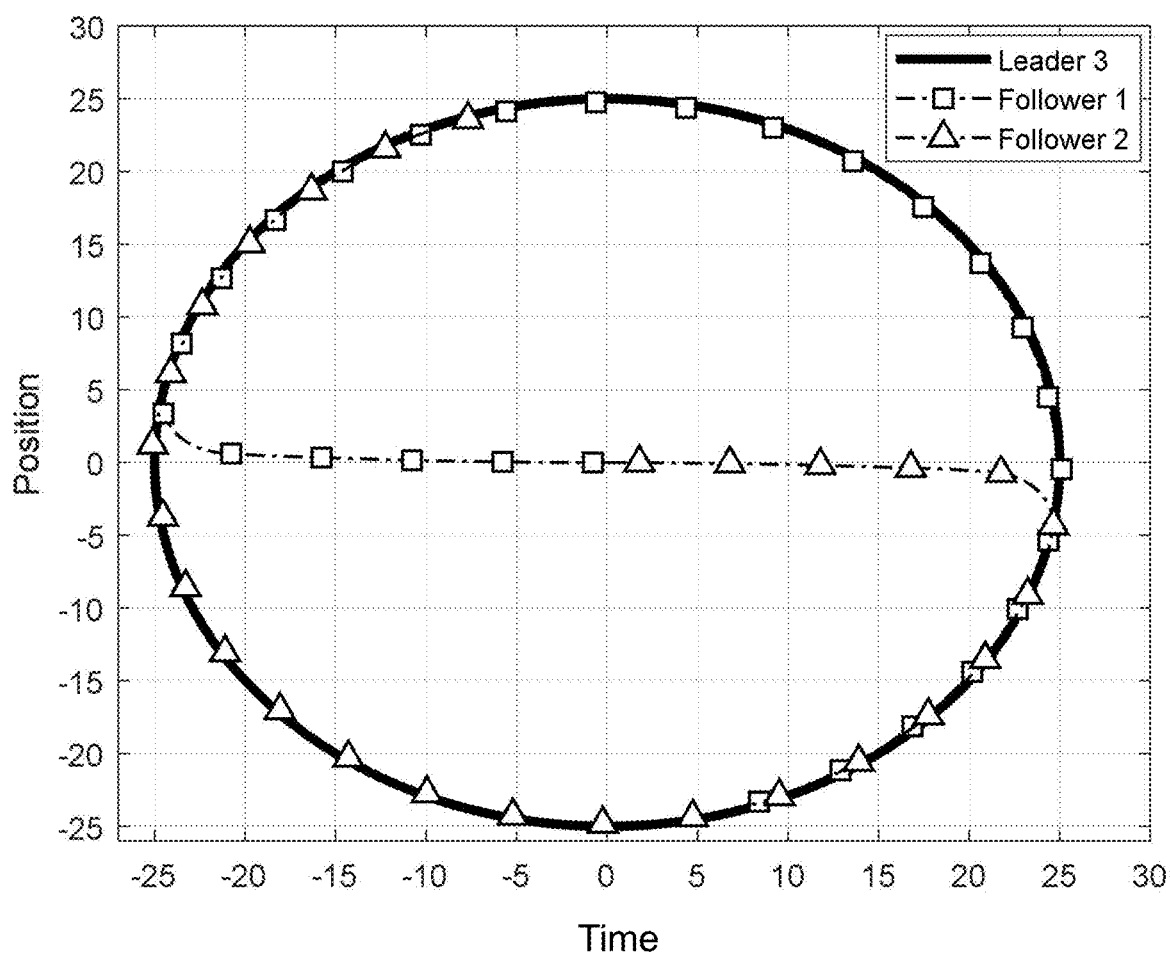
FIG. 5 is a schematic diagram showing position tracking effects of three robots during the rotation process of collaboratively handling the large workpiece according to an embodiment of the present disclosure.

Specifically, FIG. 3 is a schematic diagram of the multi-robot data-driven bipartite consensus control method, and FIG. 4 shows a topology diagram of the multi-robot system. In the figure, 1 denotes follower 1, 2 denotes follower 2, and 3 denotes leader 3. A weight between the follower 1 and the follower 2 is -1, indicating an antagonistic interaction between the two followers. A weight between the leader 3 and the follower 1 is 1, indicating that there is no antagonistic interaction between the leader and the follower. A weight between the leader 3 and the follower 2 is −1, indicating there is an antagonistic interaction between the leader and the follower.

In an embodiment, the step S400 includes the following sub-steps.

S410. Based on the topological relationship of the multi-robot system and the lateral error between the follower and leader robots, the bipartite consensus error is constructed for the rotation task.

S420. The bipartite consensus error and the lateral error data model are substituted into the designed control input objective function to solve the data-driven bipartite consensus controller.

S430. The parameter estimation algorithm is designed to estimate the unknown parameter in the controller.

S440. The estimated value participates in the controller update under the condition of satisfying the designed reset algorithm, where the parameter estimation algorithm, the reset algorithm, and the controller together form the data-driven bipartite consensus control algorithm for the multi-robot collaborative rotation of the large workpiece.

In an embodiment, in the step S410, the bipartite consensus error is specifically:

$$E_n(k) = \sum_{i=1}^{2} a_{n,i}(e_i(k) - \text{sign}(a_{n,i})e_n(k)) + a_{n,3}(e^*(k) - \text{sign}(a_{n,3})e_n(k)) \quad (14)$$

where, $E_n(k)$ denotes the bipartite consensus error of the n-th follower robot at the k-th time; $a_{i,j}$ denotes an element in an i-th row and a j-th column of a robot adjacency matrix $A \in R^{3\times 3}$; $a_{3,j}$ and $a_{i,3}$ denote a topological communication relationship between the leader robot and the follower robot, $i,j \in \{1,2,3\}$; $e^*(k)$ denotes an expected signal for the lateral error; and sign denotes a sign function:

$$\text{sign}(a) = \begin{cases} 1, & a > 0 \\ 0, & a = 0 \\ -1, & a < 0 \end{cases}$$

In an embodiment, in the step S420, the control input objective function is specifically:

$$J(u_n(k)) = \\ \left|\sum_{i=1}^{2} a_{n,i}(e_i(k) - \text{sign}(a_{n,i})e_n(k+1)) + a_{n,3}(e^*(k) - \text{sign}(a_{n,3})e_n(k+1))\right|^2 + \\ \hat{\lambda}_n|u_n(k) - u_n(k-1)|^2 \quad (15)$$

where, $J(\cdot)$ denotes the objective function of the n-th follower robot with respect to the corresponding control input $u_n(k)$; and $\hat{\lambda}_n$ denotes a penalty factor for the objective function of the n-th follower robot;

A partial derivative of $u_n(k)$ in the control input objective function is calculated to acquire the data-driven bipartite consensus controller as follows:

$$u_n(k) = \\ u_n(k-1) + \frac{\rho_1 d_n \phi_{n,1}(k) E_n(k)}{\hat{\lambda}_n + d_n^2|\phi_{n,1}(k)|^2} - \frac{d_n \phi_{n,1}(k)\sum_{i=2}^{L_u}\rho_i \phi_{n,i}(k)\Delta u_n(k-i+1)}{\hat{\lambda}_n + d_n^2|\phi_{n,1}(k)|^2} - \\ \frac{d_n \phi_{n,1}(k)\sum_{j=L_u+1}^{L_u+L_e}\rho_j \phi_{n,i}(k)\Delta e_n(k-i+l_u+1)}{\hat{\lambda}_n + d_n^2|\phi_{n,1}(k)|^2} \quad (16)$$

where, $\rho_{i_{denotes}}$ a step factor, $i \in \{1, 2, \ldots, L_u+L_e\}$; and $$d_n = \sum_{i=1}^{3}|a_{n,i}| = \sum_{i=1}^{3} a_{n,i}\text{sign}(a_{n,i})$$

denotes an element on a main diagonal of an in-degree matrix, $D=\text{diag}(d_1,d_2,d_3)$.

Specifically, the penalty factor is mainly configured to limit the variation of the control input so as to ensure the smoothness of the control input signal. Furthermore, since $\phi_{n,i}(k)$, $i=1, 2, L_u+L_e$ in Eq. (16) is unknown, the parameter estimation algorithm is designed to estimate the unknown parameter.

In an embodiment, in the step S430, the parameter estimation algorithm is specifically:

$$\phi_n(k) = \phi_n(k-1) + \frac{\eta \Delta H_n(k-1)(e_n(k) - e_n(k-1))}{\mu + \|\Delta H_n(k-1)\|^2} - \\ \frac{\eta \Delta H_n(k-1)\phi_n^T(k-1)\Delta H_n(k-1)}{\mu + \|\Delta H_n(k-1)\|^2} \quad (17)$$

where, $\eta \in (0,2]$ and $\mu \in [0, \infty)$ denote a corresponding step factor and penalty factor, respectively; and $\phi_n(k)$ denotes an estimated value of $\phi_n(k)$;

To enhance the tracking ability of the time-varying parameter in the data-driven bipartite consensus control algorithm, the reset algorithm is designed.

In the step S440, the reset algorithm is specifically:

$$\phi_n(k)=\phi_n(1), \text{ if } \|\phi_n(k)\|\leq \varepsilon \text{ or } \|\Delta H_n(k-1)\|\leq \varepsilon \text{ or } \text{sign}(\hat{\phi}_{n,j}(k))\neq\text{sign}(\hat{\phi}_{n,j}(1)), j=1,\ldots,L_u+L_e \quad (18)$$

where, ε denotes a minimum normal number.

Specifically, ε denotes a minimum normal number, which is generally set to $10^{-5}$; and $\phi_n(1)$ denotes an initial value of $\phi_n(k)$ S500. Based on the data-driven bipartite consensus control algorithm, a front wheel steering angle control signal is calculated, and the front wheel steering angle control signal is input into the multi-robot system to complete a rotation control of the large workpiece.

In an embodiment, in the step S500, the data-driven bipartite consensus control algorithm is specifically:

$$\begin{cases} \phi_n(k) = \phi_n(k-1) + \dfrac{\eta \Delta H_n(k-1)(e_n(k)-e_n(k-1))}{\mu+\|\Delta H_n(k-1)\|^2} - \\ \qquad\qquad\qquad \dfrac{\eta \Delta H_n(k-1)\phi_n^T(k-1)\Delta H_n(k-1)}{\mu+\|\Delta H_n(k-1)\|^2} \\ \phi_n(k) = \phi_n(1), \text{ if } \|\phi_n(k)\| \leq \varepsilon \text{ or } \|\Delta H_n(k-1)\| \leq \varepsilon \text{ or } \\ \qquad \text{sign}(\hat{\phi}_{n,j}(k)) \neq \text{sign}(\hat{\phi}_{n,j}(1)), j=1,\ldots,L_u+L_e \\ u_n(k) = u_n(k-1) + \dfrac{\rho_1 d_n \phi_{n,1}(k) E_n(k)}{\hat{\lambda}_n + d_n^2|\phi_{n,1}(k)|^2} - \dfrac{d_n\phi_{n,1}(k)\sum_{i=2}^{L_u}\rho_i\phi_{n,i}(k)\Delta u_n(k-i+1)}{\hat{\lambda}_n+d_n^2|\phi_{n,1}(k)|^2} - \\ \qquad \dfrac{d_n\phi_{n,1}(k)\sum_{j=L_u+1}^{L_u+L_e}\rho_j\phi_{n,i}(k)\Delta e_n(k-i+l_u+1)}{\hat{\lambda}_n+d_n^2|\phi_{n,1}(k)|^2} \end{cases}$$

where, the unknown parameter $\phi_n(k)$ in the controller (16) is replaced by the estimated value $\hat{\phi}_n(k)$ acquired through the parameter estimation algorithm (17) and the reset algorithm (18).

Finally, the control input signal of the robot system calculated by the data-driven bipartite consensus control algorithm is input into a constructed simulation model to verify the effectiveness of the data-driven bipartite consensus control method for of the multi-robot system. The main steps are as follows.

During the free movement of the robot, the lateral error $e_n(k)$ of each robot is calculated from its reference position and actual position. Based on each follower's lateral error, expectation, and Laplace matrix describing the topological relationship, the lateral error of the robot is transformed to acquire the bipartite consensus error for the rotation task. The controller is designed based on the bipartite consensus error of the multi-robot system to identify the unknown parameter $\phi_n(k)$ in the controller. Then the identified estimated value $\hat{\phi}_n(k)$ is input into the controller to generate the control input signal, so as to achieve the multi-robot rotation task.

Figure 6:
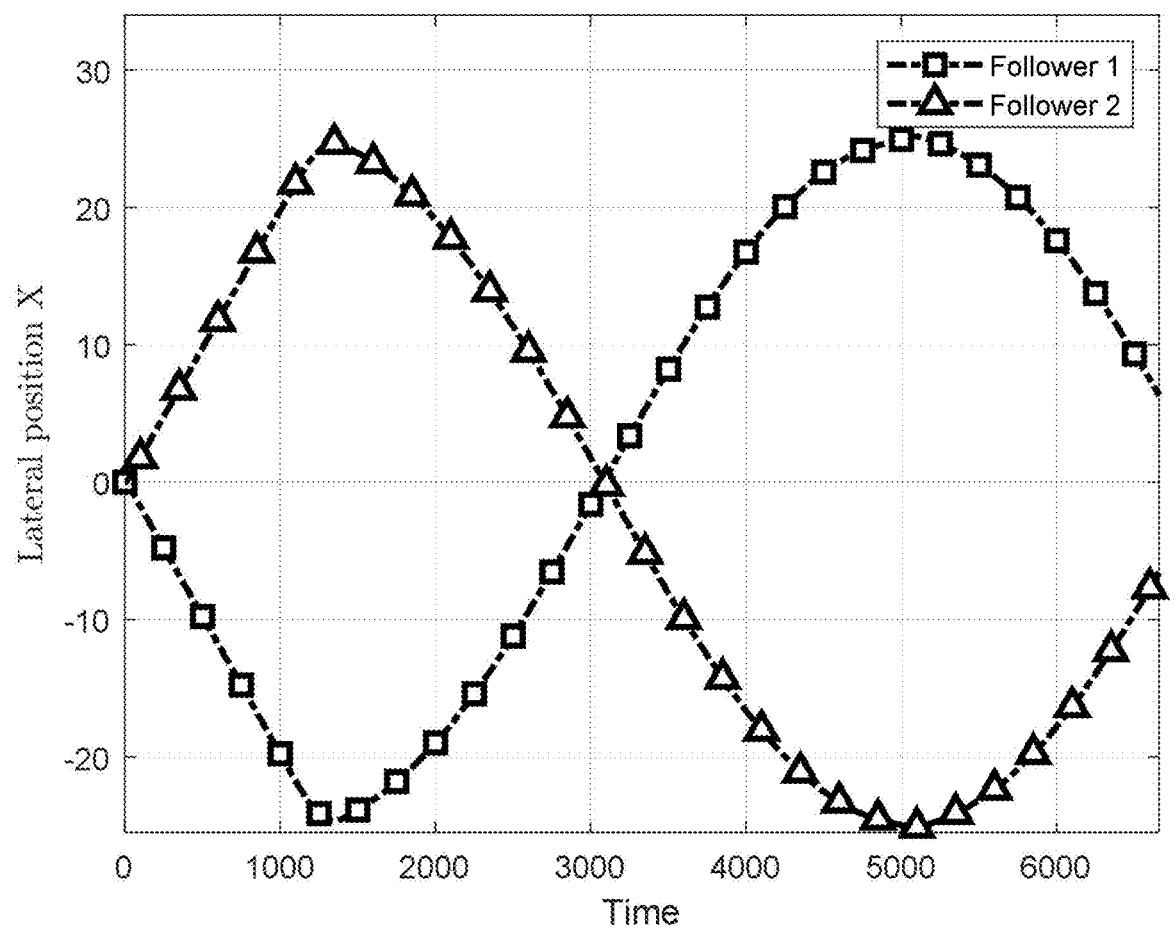
FIG. 6 is a schematic diagram showing x-axis component tracking effects of two follower robots among the three robots during the rotation process according to an embodiment of the present disclosure.
Figure 7:
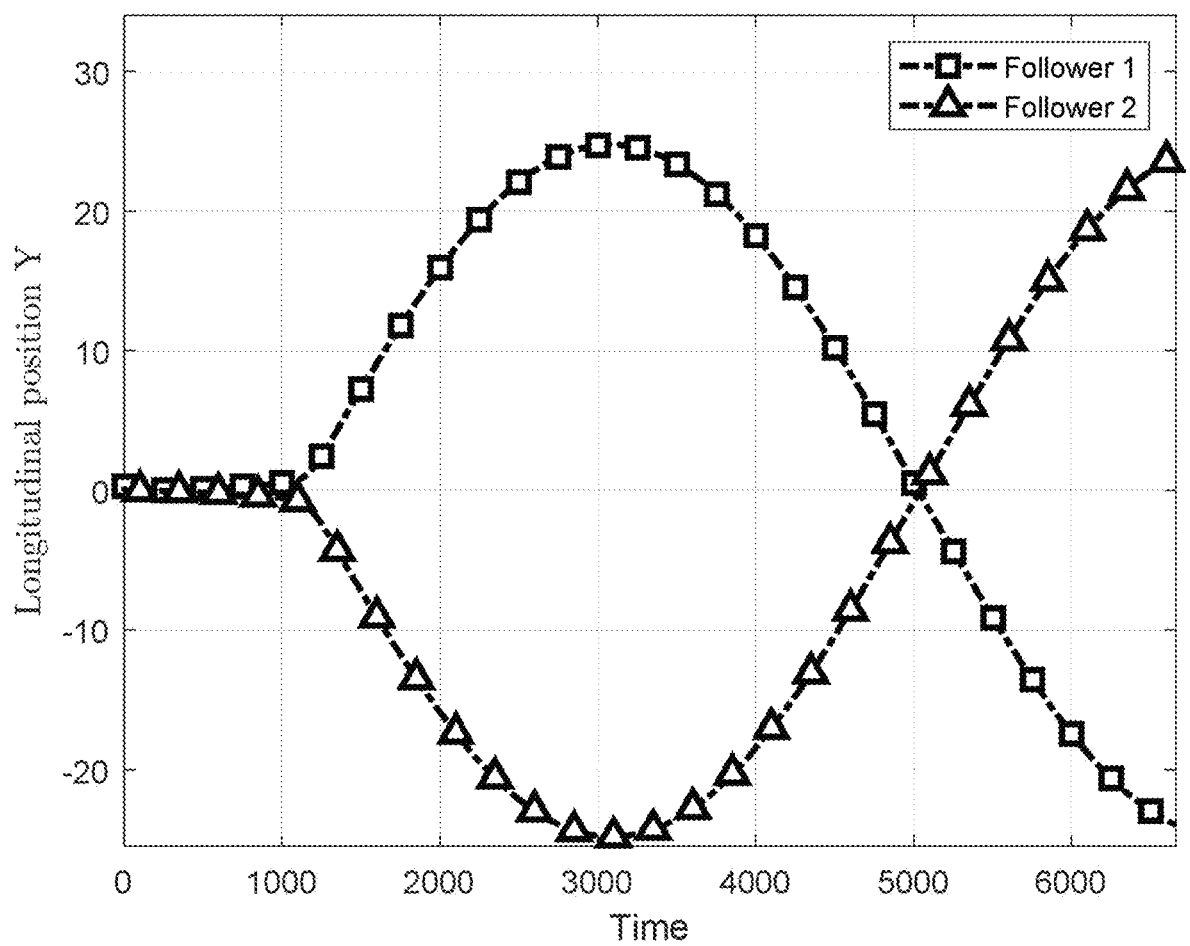
FIG. 7 is a schematic diagram showing y-axis component tracking effects of the two follower robots among the three robots during the rotation process according to an embodiment of the present disclosure.
Figure 8:
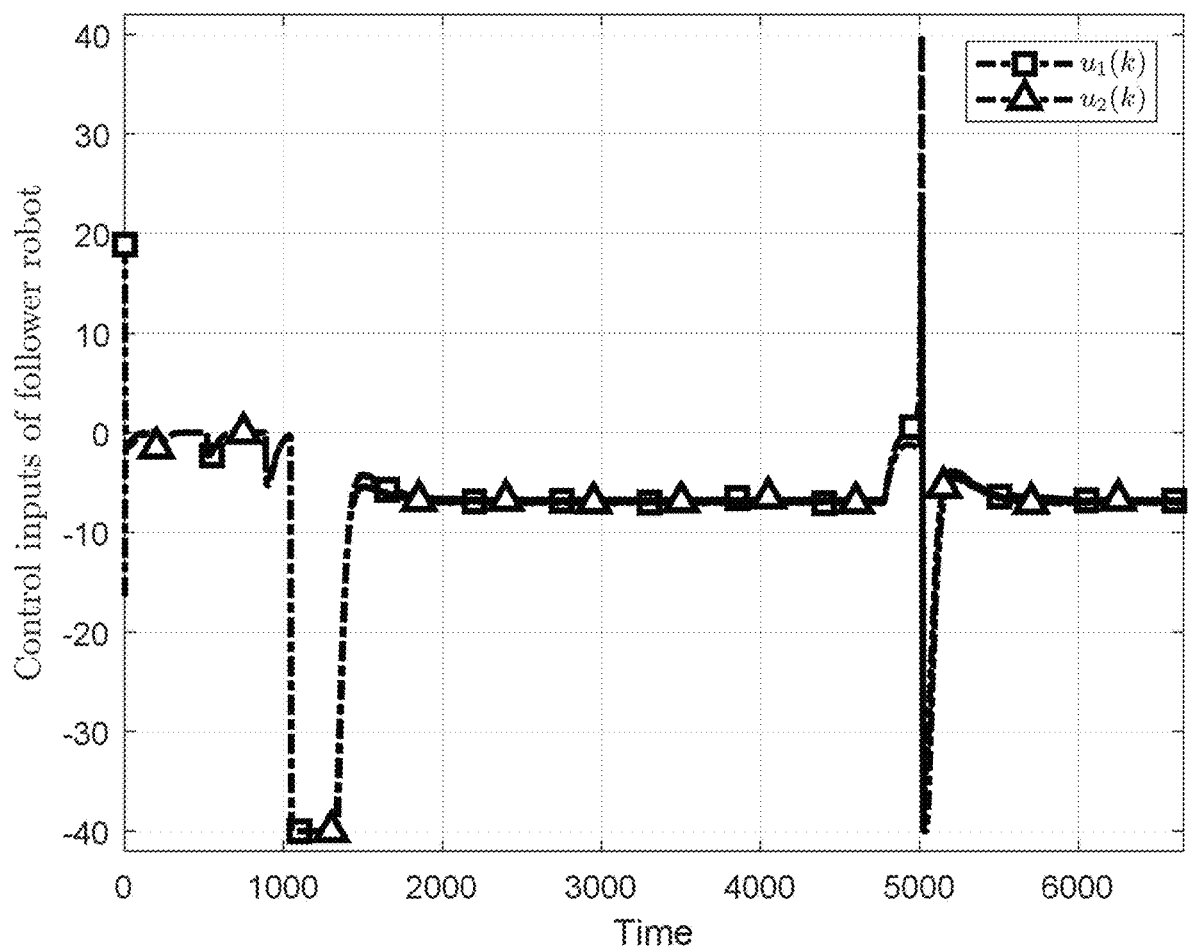
FIG. 8 is a schematic diagram showing control input curves of the follower robots 1 and 2 among the three robots during the rotation process according to an embodiment of the present disclosure.
Figure 9:
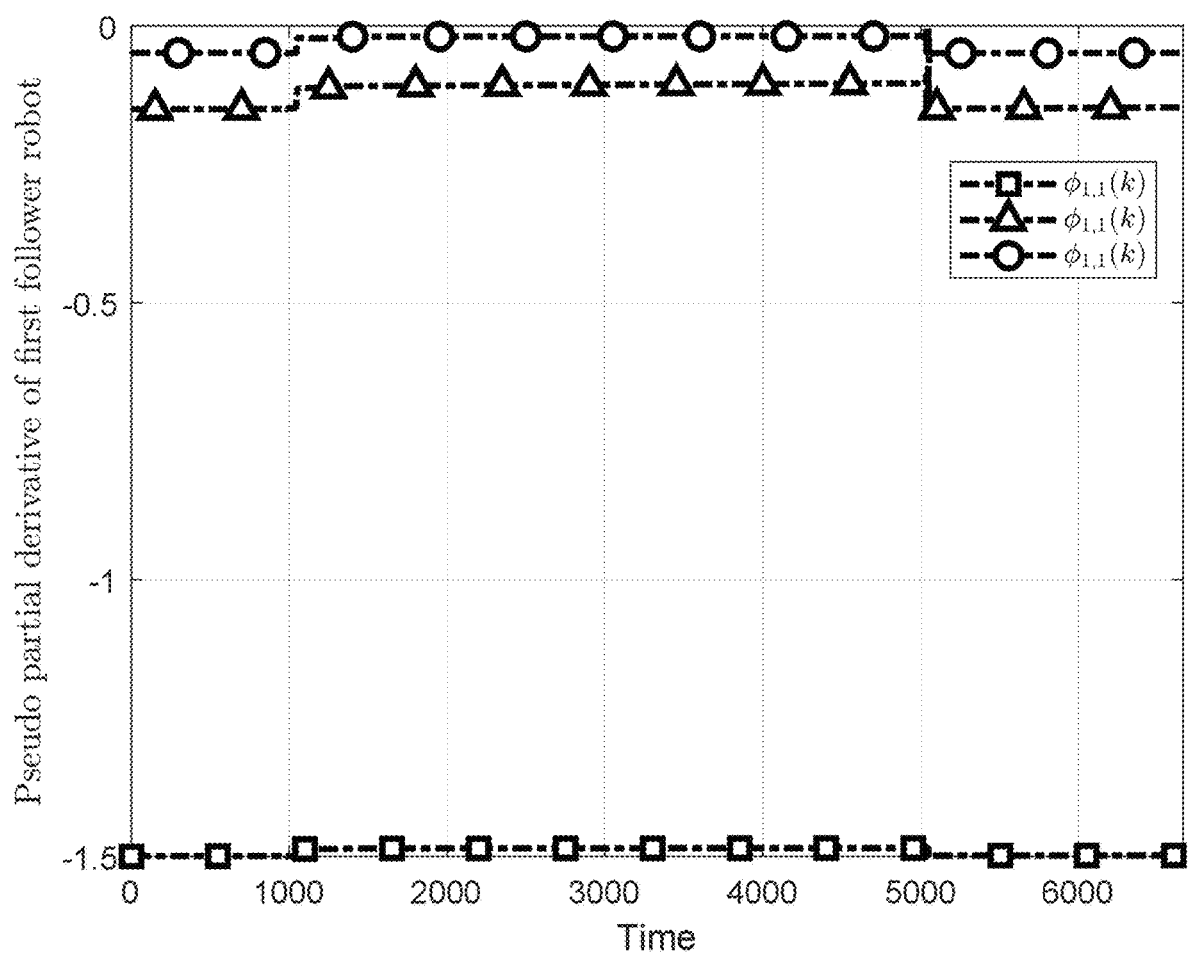
FIG. 9 is a schematic diagram showing a pseudo partial derivative adaptive control curve of the follower robot 1 among the three robots during the rotation process according to an embodiment of the present disclosure.
Figure 10:
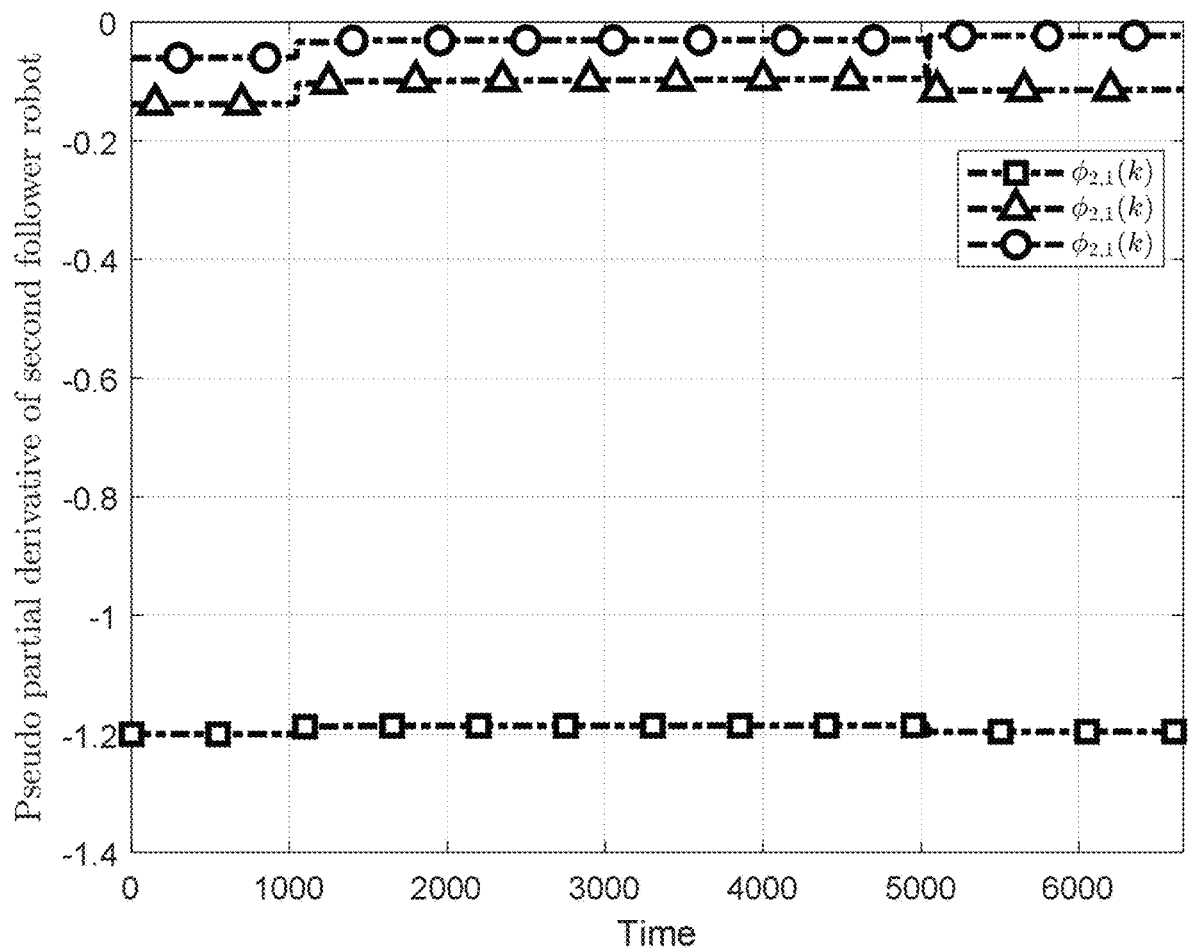
FIG. 10 is a schematic diagram showing a pseudo partial derivative adaptive control curve of the follower robot 2 among the three robots during the rotation process according to an embodiment of the present disclosure.
Figure 11:
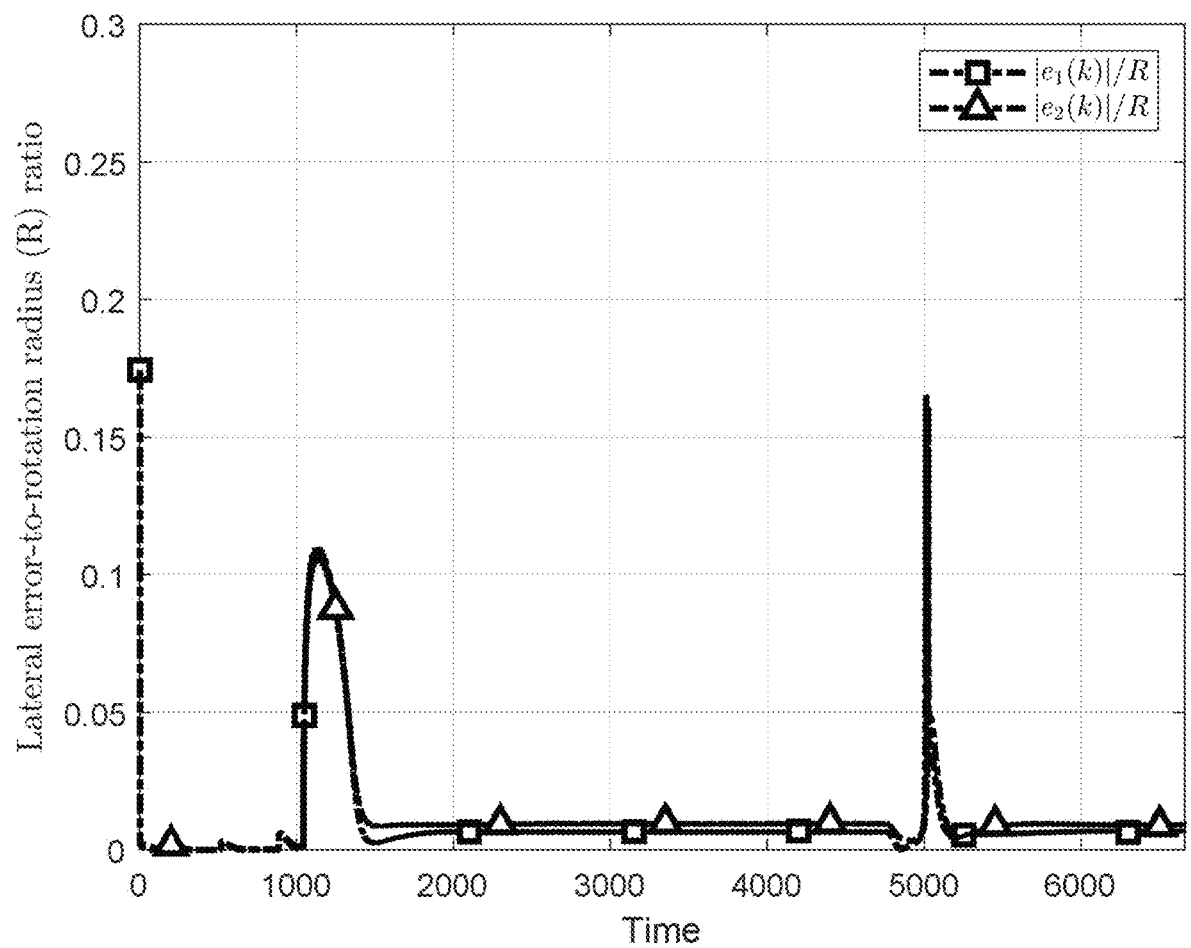
FIG. 11 is a schematic diagram showing lateral error-to-rotation radius ratios of the follower robots 1 and 2 among the three robots during the rotation process according to an embodiment of the present disclosure.
Figure 12:
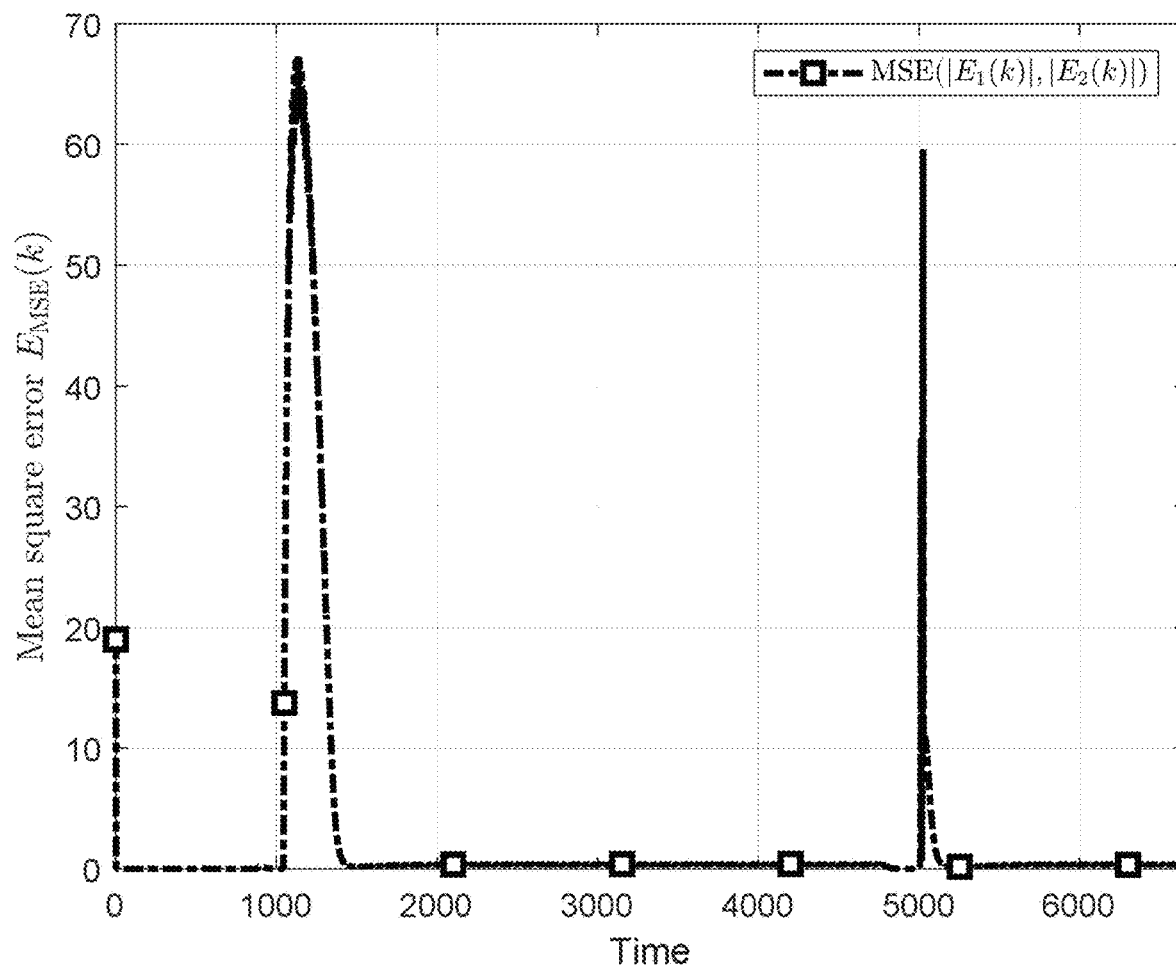
FIG. 12 is a schematic diagram showing mean square error (MSE) curves of the follower robots 1 and 2 among the three robots during the rotation process according to an embodiment of the present disclosure.

Specifically, the position tracking performance is validated through the simulation curve. Referring to FIGS. 5 to 12, FIG. 5 shows that the follower robot is able to well track the expected trajectory provided by the leader robot during the rotation process. FIGS. 6 and 7 respectively show x-axis and y-axis component tracking effects of the follower robot during rotation. It can be seen from FIGS. 6 and 7 that the running trajectories of the two follower robots are basically symmetrical along the x-axis, consistent with the effect of bipartite consensus control. FIG. 8 shows the control input signal calculated by the data-driven bipartite consensus control algorithm. FIGS. 9 and 10 show pseudo partial derivative adaptive control curves of the followers 1 and 2. FIG. 11 shows lateral error-to-rotation radius ratios of the followers 1 and 2. It can be seen that the lateral error-to-rotation radius ratios of the two follower robots remain stable at around 1%. This reflects to some extent the good tracking performance of the data-driven bipartite consensus control algorithm under the rotation radius (R=25). Finally, FIG. 12 shows a mean square error (MSE) curve between two follower robots. A MSE index function is defined as $MSE(E_1(k), E_2(k)=|E_1(k)|^2+|E_2(k)|^2)/2$. It can be seen from FIG. 12 that driven by the control input signal generated by the data-driven bipartite consensus control algorithm, the MSE and the bipartite consensus error gradually converge along the time axis.

The data-driven bipartite consensus control method has the following advantages.

1. In the present disclosure, through the data-driven bipartite consensus controller, under the leadership of the static leader robot, the follower robot synchronously moves in the opposite direction along the reference trajectory, thereby achieving the rotation task.

2. In the data-driven control method, the controller design only relies on the input/output (I/O) data of the controlled system, and does not require an accurate dynamic model. Since it is not necessary to construct a dynamic model, the present disclosure simplifies the controller design process, providing a very user-friendly control design method.

The foregoing are descriptions of preferred embodiments of the present disclosure. It should be noted that a person of ordinary skill in the art can make several improvements and modifications without departing from the principle of the present disclosure, and such improvements and modifications should be deemed as falling within the protection scope of the present disclosure.

What is claimed is:

1. A data-driven bipartite consensus control method for multi-robot collaborative rotation of a large workpiece, comprising the following steps:

S100: setting a multi-robot system for achieving a rotation task, comprising a static leader robot for providing only expected signals and two follower robots, wherein the expected signals are signals provided by the static leader robot for the two follower robots;

S200: constructing a rotation dynamics model of the follower robots, discretizing the rotation dynamics model to acquire a corresponding discrete-time system, and constructing a lateral error between the follower and leader robots based on position information between the follower and leader robots;

S300: constructing, based on the discrete-time system, an unknown nonlinear function with the lateral error and a control input as variables; and constructing, based on the unknown nonlinear function, a lateral error data model of the follower robots through a dynamic linearization technique;

S400: constructing, based on a topological relationship of the multi-robot system and the lateral error between the follower and leader robots, a bipartite consensus error for the rotation task; substituting the bipartite consensus error and the lateral error data model into a designed control input objective function to solve a data-driven bipartite consensus controller; designing a parameter estimation algorithm to estimate an unknown parameter in the data-driven bipartite consensus controller; and allowing an estimated value to participate in a controller update under a condition of satisfying a designed reset algorithm, wherein the parameter estimation algorithm, the reset algorithm, and the data-driven bipartite consensus controller together form a data-driven bipartite consensus control algorithm for the multi-robot collaborative rotation of the large workpiece; and S500: calculating, based on the data-driven bipartite consensus control algorithm, a front wheel steering angle control signal; and inputting the front wheel steering angle control signal into the multi-robot system to complete a rotation control of the large workpiece.

2. The method according to claim 1, wherein in the step S100, the multi-robot system comprises a quadrotor serving as the leader robot and two mobile robots with robotic arms as the follower robots, wherein there is an antagonistic interaction between the follower robots; and the antagonistic interaction means that movement directions are opposite to front wheel steering directions.

3. The method according to claim 2, wherein the step S200 comprises:

S210: constructing a rotation dynamics model of a single follower robot, comprising:

$$\begin{cases} \dot{x}_n = v_0\cos(\theta_n) \\ \dot{y}_n = v_0\sin(\theta_n) \\ \dot{\theta}_n = v_0\tan(u_n)/L \end{cases}$$

wherein $n_e \in \{1,2\}$ denotes an n-th follower robot; $x_n$ denotes a lateral displacement of the n-th follower robot; $y_n$ denotes a longitudinal displacement of the n-th follower robot; $\theta_n$ denotes a heading angle of the n-th follower robot; $v_0$ denotes a constant speed of the follower robot during a rotation process; $u_n$ denotes a control input, representing a front wheel steering angle of the n-th follower robot; L denotes a wheelbase of the follower robot; and $\dot{x}_n$, $\dot{y}_n$, and $\dot{\theta}_n$ respectively denote first-order derivatives of the lateral displacement $x_n$, the longitudinal displacement $y_n$, and the heading angle $\theta_n$ of the n-th follower robot;

S220: discretizing the rotation dynamics model of the single follower robot to acquire a discrete-time system of the single follower robot, comprising:

$$\begin{cases} x_n(k+1) = x_n(k) + v_0 T_s \cos(\theta_n(k)) \\ y_n(k+1) = y_n(k) + v_0 T_s \sin(\theta_n(k)) \\ \theta_n(k+1) = \theta_n(k) + v_0 \tan(u_n(k))/L \end{cases}$$

wherein $T_s$ denotes a sampling time; $k \in \{1, 2, \ldots, \infty\}$ denotes a discrete time; $x_n(k+1)$, $y_n(k+1)$, and $\theta_n(k+1)$ denote a lateral displacement, a longitudinal displacement, and a heading angle of the n-th follower robot at a (k+1)-th time, respectively; $x_n(k)$, $y_n(k)$, and $\theta_n(k)$ denote a lateral displacement, a longitudinal displacement, and a heading angle of the n-th follower robot at a k-th time, respectively; L and $v_0$ denote the wheelbase and the constant speed, respectively; and $u_n(k)$ denotes a control input, comprising a front wheel steering angle, of the n-th follower robot at the k-th time; and S230: constructing the lateral error between the follower and leader robots based on the position information between the follower and leader robots.

4. The method according to claim 3, wherein in the step S230, the lateral error between the n-th follower and the leader robot at the k-th time is:

$$e_n(k) = l_d \cdot \cos(\alpha_n(k))$$

wherein $$\alpha_n(k) = \arctan\left(\frac{y_n^*(k) - y_n(k)}{x_n^*(k) - x_n(k)}\right) - \theta_n(k); y_n^*(k) \text{ and } x_n^*(k)$$

denote expected signals provided by the leader robot for the n-th follower; and $l_d$ denotes a forward distance.

5. The method according to claim 4, wherein the step S300 comprises:

S310: constructing, based on the discrete-time system, the unknown nonlinear function with the lateral error and the control input as variables, comprising:

$$e_n(k+1) = f_n(u_n(k), \ldots, u_n(k-n_u+1), e_n(k), \ldots, e_n(k-n_e+1), x_n(k), y_n(k), \theta_n(k))$$

wherein $e_n(k+1)$ denotes the lateral error of the n-th follower robot at the (k+1)-th time; $f_n(\cdot\cdot\cdot)$ denotes an unknown scalar nonlinear function that is partially-derivable, with continuous partial derivatives, for first $n_u + n_e$ variables; $n_u$ and $n_e$ are two unknown positive integers, representing system input and output orders; and $u_n(k-n_u+1)$ and $e_n(k-n_e+1)$ denote a control input of the n-th follower robot at a $(k-n_u+1)$-th time and a lateral error thereof at a $(k-n_e+1)$-th time, respectively; and S320: constructing, based on the unknown nonlinear function, the lateral error data model of the follower robots through the dynamic linearization technique, comprising:

$$e_n(k+1) = e_n(k) + \phi_n^T(k) \Delta H_n(k)$$

where, $\phi_n(k) = [\phi_{n,1}(k), \ldots, \phi_{n,n_u}(k), \phi_{n,n_e+1}(k), \ldots, \phi_{n,n_u+n_e}(k)]^T$ denotes a pseudo gradient of the n-th follower robot; $\Delta H_n(k) = [\Delta u_n(k), \ldots, \Delta u_n(k-L_u+1), \Delta e_n(k), \ldots, \Delta e_n(k-L_e+1)]^T$ denotes a vector composed of all control input increments and system output increments of the n-th follower robot; $1 \leq L_e \leq n_e$ and $0 \leq L_u \leq n_u$ are two positive integers selected based on system complexity; $L_e$ and $L_u$ denotes input and output pseudo orders of the multi-robot system, respectively; $\Delta u_n(k) = u_n(k) - u_n(k-1)$; and $\Delta e_n(k) = e_n(k) - e_n(k-1)$.

6. The method according to claim 5, wherein the step S400 comprises:

S410: constructing, based on the topological relationship of the multi-robot system and the lateral error between the follower and leader robots, the bipartite consensus error for the rotation task;

S420: substituting the bipartite consensus error and the lateral error data model into the designed control input objective function to solve the data-driven bipartite consensus controller;

S430: designing the parameter estimation algorithm to estimate the unknown parameter in the data-driven bipartite consensus controller; and S440: allowing the estimated value to participate in the controller update under the condition of satisfying the designed reset algorithm, wherein the parameter estimation algorithm, the reset algorithm, and the data-driven bipartite consensus controller together form the data-driven bipartite consensus control algorithm for the multi-robot collaborative rotation of the large workpiece.

7. The method according to claim 6, wherein in the step S410, the bipartite consensus error is:

$$E_n(k) = \sum_{i=1}^{2} a_{n,i}(e_i(k) - \text{sign}(a_{n,i})e_n(k)) + a_{n,3}(e^*(k) - \text{sign}(a_{n,3})e_n(k))$$

wherein $E_n(k)$ denotes the bipartite consensus error of the n-th follower robot at the k-th time; $a_{n,i}$ denotes an element in an n-th row and an i-th column of a robot adjacency matrix $A \in R^{3\times 3}$; $a_{3,j}$ and $a_{i,3}$ denote a topological communication relationship between the leader robot and the follower robot, $i,j \in \{1,2,3\}$; $e^*(k)$ denotes an expected signal for the lateral error; and sign denotes a sign function:

$$\text{sign}(a) = \begin{cases} 1, & a > 0 \\ 0, & a = 0 \\ -1, & a < 0 \end{cases}.$$

8. The method according to claim 7, wherein in the step S420, the control input objective function is:

$$J(u_n(k)) =$$

$$\left| \sum_{i=1}^{2} a_{n,i}(e_i(k) - \text{sign}(a_{n,i})e_n(k+1)) + a_{n,3}(e^*(k) - \text{sign}(a_{n,3})e_n(k+1)) \right|^2 +$$

$$\hat{\lambda}_n |u_n(k) - u_n(k-1)|^2$$

wherein J(·) denotes the objective function of the n-th follower robot with respect to the corresponding control input $u_n(k)$; and $\hat{\lambda}_n$ denotes a penalty factor for the objective function of the n-th follower robot;

calculating a partial derivative of $u_n(k)$ in the control input objective function to acquire the data-driven bipartite consensus controller as follows:

$$u_n(k) = u_n(k-1) + \frac{\rho_1 d_n \phi_{n,1}(k) E_n(k)}{\hat{\lambda}_n + d_n^2 |\phi_{n,1}(k)|^2} - \frac{d_n \phi_{n,1}(k) \sum_{i=2}^{L_u} \rho_i \phi_{n,i}(k) \Delta u_n(k-i+1)}{\hat{\lambda}_n + d_n^2 |\phi_{n,1}(k)|^2} -$$

$$\frac{d_n \phi_{n,1}(k) \sum_{j=L_u+1}^{L_u+L_e} \rho_j \phi_{n,i}(k) \Delta e_n(k-i+l_u+1)}{\hat{\lambda}_n + d_n^2 |\phi_{n,1}(k)|^2}$$

wherein $\rho_i$ denotes a step factor, $i \in \{1,2,\ldots,L_u+L_e\}$; and $$d_n = \sum_{i=1}^{3} |a_{n,i}| = \sum_{i=1}^{3} a_{n,i} \text{sign}(a_{n,i})$$

denotes an element on a main diagonal of an in-degree matrix, $D = \text{diag}(d_1, d_2, d_3)$.

9. The method according to claim 8, wherein in the step S430, the parameter estimation algorithm is:

$$\hat{\phi}_n(k) = \hat{\phi}_n(k-1) +$$

$$\frac{\eta \Delta H_n(k-1)(e_n(k) - e_n(k-1))}{\mu + \|\Delta H_n(k-1)\|^2} - \frac{\eta \Delta H_n(k-1) \hat{\phi}_n^T(k-1) \Delta H_n(k-1)}{\mu + \|\Delta H_n(k-1)\|^2}$$

wherein $\eta \in (0,2]$ and $\mu \in [0, \infty)$ denote a corresponding step factor and penalty factor, respectively; and $\hat{\phi}_n(k)$ denotes an estimated value of $\phi_n(k)$;

in the step S440, the reset algorithm is:

$\hat{\phi}_n(k) = \hat{\phi}_n(1)$, if $\|\hat{\phi}_n(k)\| \leq \varepsilon$ or $\|\Delta H_n(k-1)\| \leq \varepsilon$ or $\text{sign}(\hat{\phi}_{n,j}(k)) \neq \text{sign}(\hat{\phi}_{n,j}(1)), j=1,\ldots,L_u+L_e$ where, $\varepsilon$ denotes a minimum positive number.

10. The method according to claim 9, wherein in the step S500, the data-driven bipartite consensus control algorithm is:

$$\begin{cases} \hat{\phi}_n(k) = \hat{\phi}_n(k-1) + \dfrac{\eta \Delta H_n(k-1)(e_n(k) - e_n(k-1))}{\mu + \|\Delta H_n(k-1)\|^2} - \\ \qquad\qquad\qquad\qquad \dfrac{\eta \Delta H_n(k-1) \hat{\phi}_n^T(k-1) \Delta H_n(k-1)}{\mu + \|\Delta H_n(k-1)\|^2} \\ \hat{\phi}_n(k) = \hat{\phi}_n(1), \text{ if } \|\hat{\phi}_n(k)\| \leq \varepsilon \text{ or } \|\Delta H_n(k-1)\| \leq \varepsilon \text{ or} \\ \qquad\qquad \text{sign}(\hat{\phi}_{n,j}(k)) \neq \text{sign}(\hat{\phi}_{n,j}(1)), j = 1, \ldots, L_u + L_e \\ u_n(k) = u_n(k-1) + \dfrac{\rho_1 d_n \hat{\phi}_{n,1}(k) E_n(k)}{\hat{\lambda}_n + d_n^2 |\hat{\phi}_{n,1}(k)|^2} - \dfrac{d_n \hat{\phi}_{n,1}(k) \sum_{i=2}^{L_u} \rho_i \hat{\phi}_{n,i}(k) \Delta u_n(k-i+1)}{\hat{\lambda}_n + d_n^2 |\hat{\phi}_{n,1}(k)|^2} - \\ \qquad\qquad\qquad\qquad \dfrac{d_n \phi_{n,1}(k) \sum_{j=L_u+1}^{L_u+L_e} \rho_j \hat{\phi}_{n,i}(k) \Delta e_n(k-i+l_u+1)}{\hat{\lambda}_n + d_n^2 |\phi_{n,1}(k)|^2} \end{cases}$$

\* \* \* \* \*